United States Patent [19]

Karube

[11] Patent Number: 5,307,367
[45] Date of Patent: * Apr. 26, 1994

[54] LASER OSCILLATING APPARATUS
[75] Inventor: Norio Karube, Machida, Japan
[73] Assignee: Fanuc, Ltd., Yamanashi, Japan
[*] Notice: The portion of the term of this patent subsequent to Dec. 11, 2007 has been disclaimed.
[21] Appl. No.: 834,524
[22] PCT Filed: May 28, 1991
[86] PCT No.: PCT/JP91/00720
  § 371 Date: Feb. 6, 1992
  § 102(e) Date: Feb. 6, 1992
[87] PCT Pub. No.: WO91/20114
  PCT Pub. Date: Dec. 26, 1991

[30] Foreign Application Priority Data
  Jun. 11, 1990 [JP] Japan .................................. 2-152293
[51] Int. Cl.$^5$ ............................................. H01S 3/08
[52] U.S. Cl. ................................... 472/98; 372/108; 372/106; 372/99; 372/93; 372/27; 372/9
[58] Field of Search .................. 372/99, 94, 92, 108, 372/98, 93, 106, 9, 27

[56] References Cited
U.S. PATENT DOCUMENTS

| | | | |
|---|---|---|---|
| 4,340,969 | 7/1982 | Hamilton et al. | 372/99 |
| 4,634,831 | 1/1987 | Martinen et al. | 219/121 LG |
| 4,977,574 | 12/1990 | Karube | 372/94 |
| 5,023,886 | 6/1991 | Hobart et al. | 372/99 |
| 5,148,443 | 9/1952 | Du et al. | 372/94 |

FOREIGN PATENT DOCUMENTS

| | | |
|---|---|---|
| 56-138974 | 10/1981 | Japan . |
| 59-205780 | 11/1984 | Japan . |
| 62-169385 | 7/1987 | Japan . |
| 63-91618 | 4/1988 | Japan . |
| 1-181484 | 7/1989 | Japan . |

Primary Examiner—Leon Scott, Jr.
Attorney, Agent, or Firm—Staas & Halsey

[57] ABSTRACT

A laser oscillating apparatus equipped with a folded-type laser resonator designed to fold an optical axis by using a reflecting mirror (11) in addition to an output coupling mirror (4) and a rear mirror (10). The rear mirror (10) consists of a roof reflector having a ridge (10a) set at an angle of $\pi/4$ with respect to a plane generated by a folded optical axis. At this time, the reflectance of the rear mirror (10) is higher in a linearly polarizing component having an electric-field vector parallel to the direction of the ridge (10a) than that in a component having an electric-field vector orthogonally intersecting the ridge. The laser beam in the resonator is linearly polarized in the direction of the ridge (10a) in an optical path running between the rear mirror (10) and the reflecting mirror (11) closest to the rear mirror (10). The linearly polarized beam is reflected by the reflecting mirror (11). The reflecting mirror (11) generates a total $\pi/2$ phase retardation with respect to the parallel and vertical polarizing components, and accordingly, an emitted beam (13) thus produced is a circularly polarized beam.

7 Claims, 4 Drawing Sheets

LASER OSCILLATING APPARATUS

DESCRIPTION

1. Technical Field

The present invention relates to a high-output laser oscillating apparatus used for cutting metals or nonmetals, and more particularly, to a laser oscillating apparatus emitting a circularly polarized output beam.

2. Background Art

It is well known that the use of a circularly polarized beam is advantageous in laser beam cutting, and thus 7ays must be found of producing a circularly polarized beam. Conventionally, a beam emitted directly from a laser resonator is a linearly polarized beam, which is converted to a circularly polarized beam by using an external optical part.

FIG. 4 shows the structure of a conventional laser oscillating apparatus equipped with such an external optical part. According to this prior art, a circularly polarized beam is produced by first oscillating a linearly polarized beam in a resonator, and then converting the oscillated beam into a circularly polarized beam by using an external optical system as shown in FIG. 4. FIG. 4 shows only an optical system, and well-known laser exciting parts such as a discharge tube are omitted. In FIG. 4, the laser resonator consists of a rear mirror 1, reflecting mirrors 2 and 3, and an output coupling mirror 4.

Based on a well-known principle, a laser beam in the resonator is emitted as a linearly polarized beam, E vector of which orthogonally intersects a plane specified by the optical axes 7a, 7b and 7c. In FIG. 4, the plane has been rotated around the straight line 7a by $\pi/4$, and accordingly, the beam 8 emitted from the resonator is a linearly polarized beam inclined by $\pi/4$ with respect to the ground surface.

The emitted beam 8 is then guided by a pair of $\pi/2$ phase retarders 5 and 6, and then, based on a well-known principle, a beam 9 emitted from the retarders 5 and 6 is converted into a circularly polarized beam.

Nevertheless, the conventional method shown in FIG. 4 has problems.

The large number of optical parts involved makes the system expensive, and further, the system becomes large and complicated.

Furthermore, unless the external optical system is manufactured with the same high precision as the laser resonator, the pointing stability of the resulting laser beam is unsatisfactory, and accordingly, the cutting capability is poor.

DISCLOSURE OF THE INVENTION

The present invention is intended to solve the foregoing problems. An object of the present invention is to provide a laser oscillating apparatus by which a circularly polarized beam is directly emitted, and thus the use of an external optical system can be eliminated.

To fulfill the aforementioned object, the present invention provides a laser oscillating apparatus equipped with a folded resonator which, in addition to an output coupling mirror and a rear mirror, uses a reflecting mirror to fold the optical axis. The laser oscillating apparatus comprises the rear mirror, which consists of a roof reflector having a ridge set at an angle of $\pi/4$ with respect to a plane produced by the reflected optical axes, and the reflecting mirror or mirrors producing a $\pi/2$ phase retardation with respect to parallel and vertical polarizing components.

The rear mirror is composed of the roof reflector having a ridge set at an angle of $\pi/4$ with respect to the plane generated by the reflected optical axes. With regard to the rear mirror, the reflectance of the linearly polarizing component having the electric-field vector parallel to the direction of the ridge is higher than that of the component orthogonally intersecting the direction of the ridge. Therefore, the laser beam in the resonator is linearly polarized in the direction of the ridge in the optical path running between the rear mirror and the reflecting mirror closest to the rear mirror. The linearly polarized beam is reflected by the reflecting mirror or mirrors to give the parallel and vertical polarizing components a total $\pi/2$ phase retardation. Thus, the emitted beam, obtained by a well-known optical principle, becomes a circularly polarized beam.

BEST MODE OF CARRYING OUT OF THE INVENTION

Each embodiment of the present invention is now described with reference to the accompanying drawings.

Figure 1:
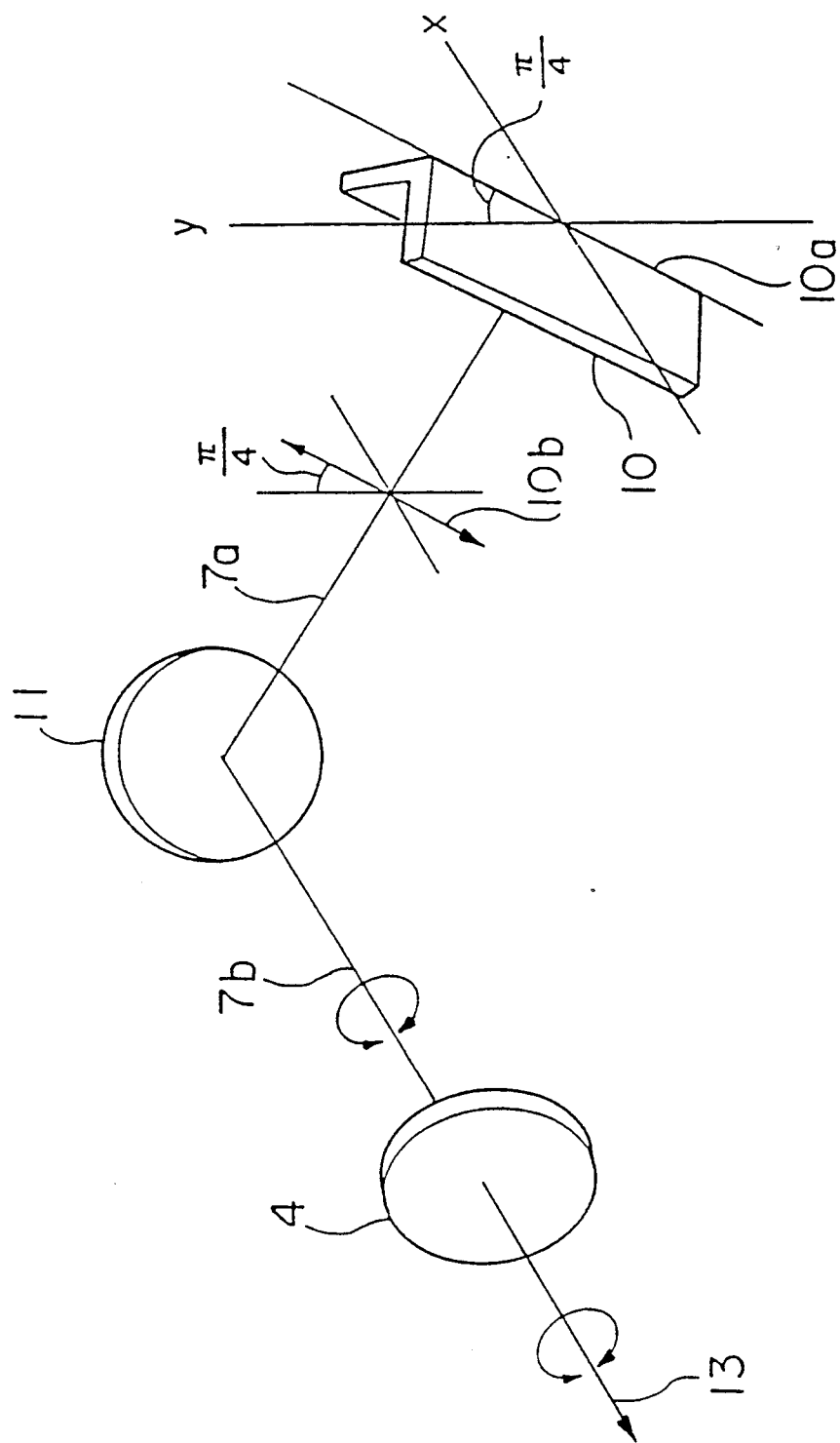
FIG. 1 shows the configuration of a laser oscillating apparatus of the first embodiment according to the present invention.

FIG. 1 shows the configuration of the resonator of the laser oscillating apparatus according to the first embodiment of the present invention. In the drawing, the resonator is comprised of a rear mirror 10, a reflecting mirror 11, and an output coupling mirror 4. Note, laser exciting parts such as a discharge tube are not shown.

The rear mirror 10 is a right-angled, roof reflector having a ridge 10a inclined by $\pi/4$ with respect to a plane formed by two optical axes 7a and 7b, as illustrated.

The reflecting mirror 11 is a phase retarder and gives the parallel and vertical polarizing components a $\pi/2$ phase retardation; this is a well-known phase retarder consisting of dielectric films having a high reflectance and dielectric films having a low reflectance arranged alternately one above the other to thereby retard the phase of reflecting beam by a multiple interference thereof. The output coupling mirror 4 is a usual element having no reflectance direction.

In the resonator having the foregoing configuration, the optical axes 7a and 7b of the laser beam in the resonator are bent by the reflecting mirror 11, as illustrated. Further, in the domain of the optical axis 7a (the optical path running between the rear mirror 10 and the reflecting mirror 11), a laser beam 10b is linearly polarized in the direction of the ridge 10a of the rear mirror 10, i.e., the direction at an angle of $\pi/4$ with respect to a plane formed by the optical axes 7a and 7b, because, in the roof reflector 10, the reflectance of the linearly polarizing component having the electric-field vector parallel to the direction of the ridge 10a is higher than that of the polarizing component orthogonally intersecting the direction of the ridge 10a, according to a well-known optical principle.

When the laser beam 10b is reflected by the reflecting mirror 11 having a $\pi/2$ phase retardation, it is converted into a circularly polarized beam in a domain of the optical axis 7b (the optical path running between the reflecting mirror 11 and the output coupling mirror 4), also according to a well-known optical principle, and at this time, a laser beam 13 emitted from the output coupling mirror 4 is also a circularly polarized beam.

Therefore, according to this embodiment, a circularly polarized beam is emitted directly from the resonator without using an external optical system, thus enabling a significant reduction in the number of optical parts required, to thereby simplify the structure of the resonator, and accordingly, reduce the size and cost thereof. Further, the pointing stability of the laser beam at the time of cutting is improved, resulting in a greater cutting capability.

Figure 2:
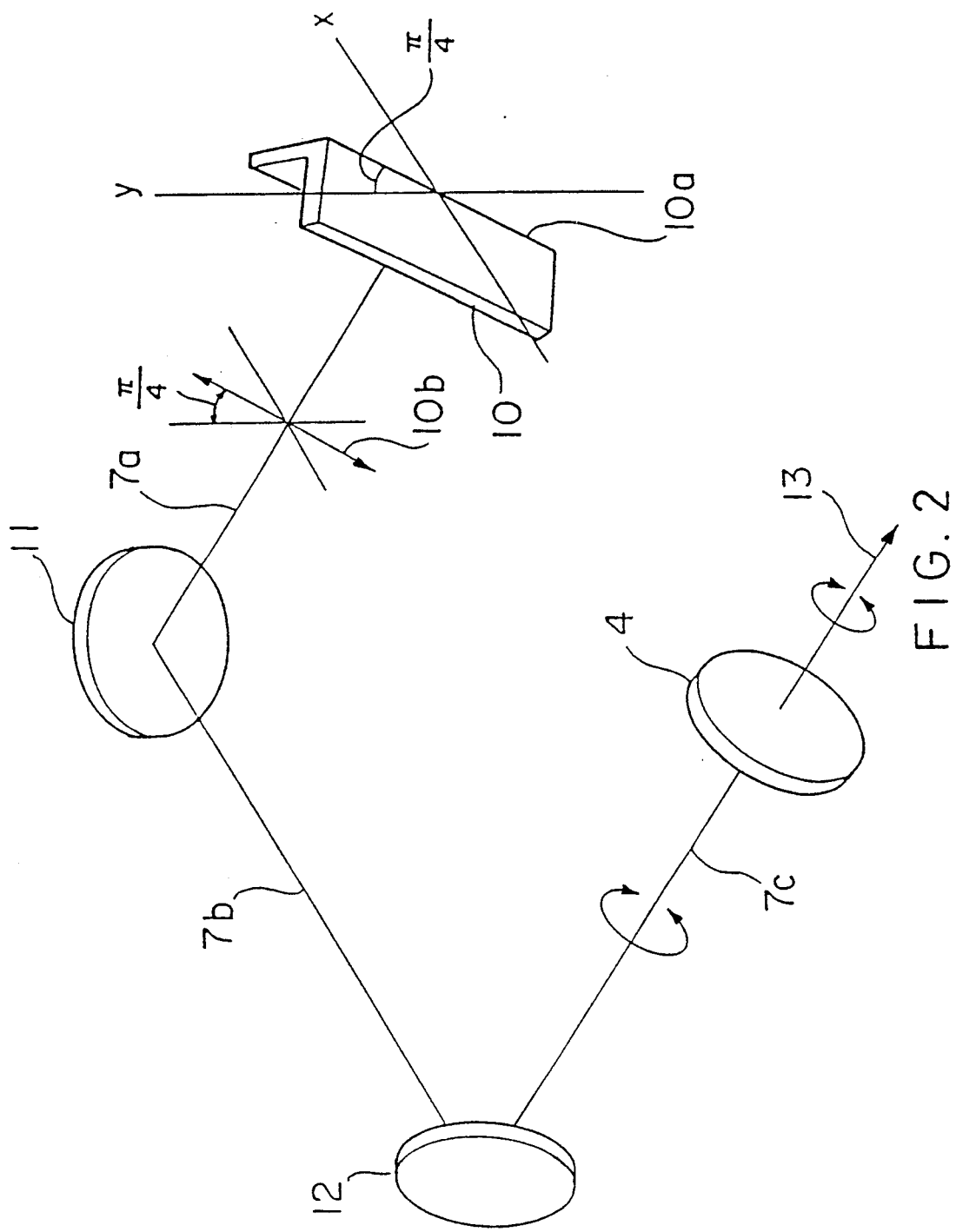
FIG. 2 shows the configuration of a laser oscillating apparatus of the second embodiment according to the present invention.

The second embodiment of the present invention is now described with reference to FIG. 2; this differs from the first embodiment in that the resonator is provided with reflecting mirrors 11 and 12 which also serve as phase retarders to twice fold a laser beam, the two phase retarders together producing a total $\pi/2$ phase retardation. This retardation may be performed by the two phase retarders, wherein each retards the phase by $\pi/4$, or by using only one thereof to retard the phase by $\pi/2$ and then using a zero-shifting mirror. In either case, the laser beam is oscillated to form a linearly polarized beam which is inclined by $\pi/4$ in the domain of the optical axis 7a, and to form a circularly polarized beam in the domain of the optical axis 7c (the optical path running between the reflecting mirror 12 and the output coupling mirror 4), and a laser beam 13 is emitted as a circularly polarized beam from the output coupling mirror 4.

Figure 3:
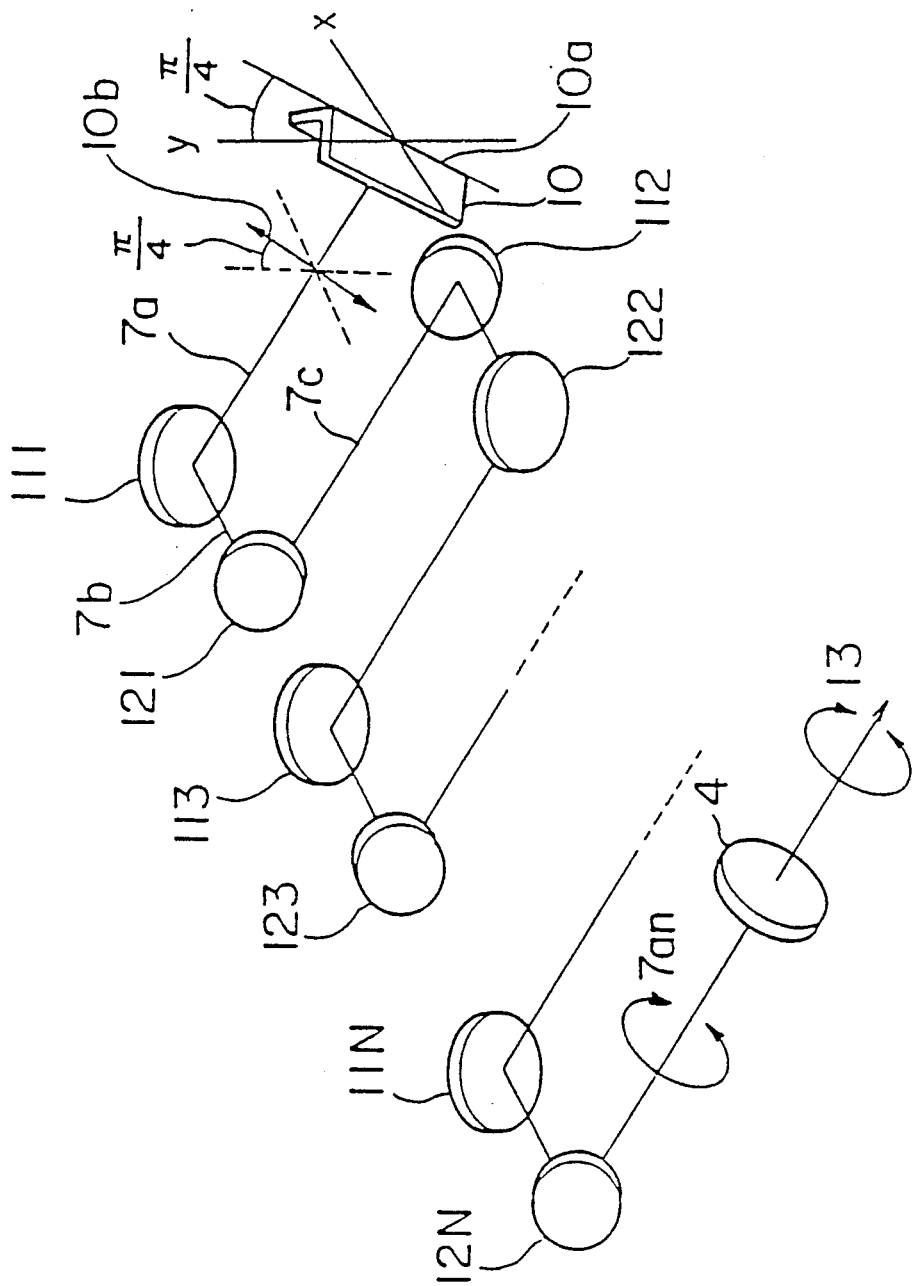
FIG. 3 shows the configuration of a laser oscillating apparatus of the third embodiment according to the present invention.
Figure 4:
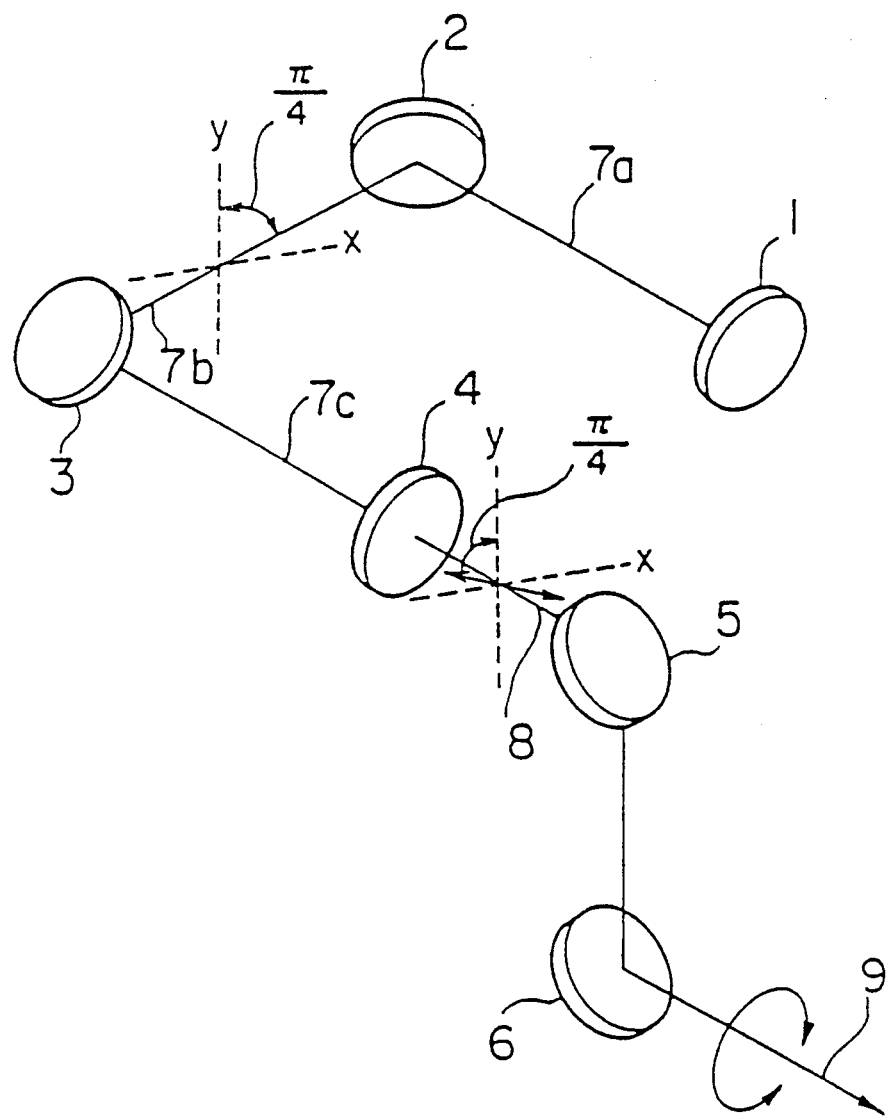
FIG. 4 shows the configuration of a conventional laser oscillating apparatus for obtaining a circularly polarized beam.

The third embodiment of the present invention is now described with reference to FIG. 3. In this embodiment, the resonator is a multi folded type consisting of many reflecting mirrors 111, 112, . . . , 11N, 121, 122, . . . , 12N. All of the reflecting mirrors, which also serve as the phase retarders, produce a total $\pi/2$ phase retardation, and the laser beam 13 is emitted as a circularly polarized beam &rom the output coupling mirror 4, as in the first or second embodiment.

As explained above, according to the present invention, a roof reflector is used for the rear mirror so that a circularly polarized beam can be emitted directly from a resonator, and therefore, an external optical system is not required for obtaining a circularly polarized beam, resulting in a significant reduction in the number of optical parts needed, to thereby make it possible to simplify the structure of the system, and to reduce the size and cost thereof. Furthermore, the pointing stability of the laser beam at the time of cutting can be improved, resulting in a greater cutting capability.

I claim:

1. A laser oscillating apparatus for producing a circularly polarized beam from an oscillating beam using a plane produced by two optical axes, comprising:

a rear mirror linearly polarizing the oscillating beam, wherein the rear mirror includes a roof reflector having a ridge set at an angle of $\pi/4$ with respect to the plane produced by the two optical axes; and reflecting means for receiving the linearly polarized beam and for converting the linearly polarized beam into the circularly polarized beam, the reflecting means having a $\pi/2$ phase retardation.

2. The laser oscillating apparatus according to claim 1, wherein the reflecting means comprises a reflecting mirror having the $\pi/2$ phase retardation.

3. The laser oscillating apparatus according to claim 1, wherein the reflecting means comprises two reflecting mirrors providing a total of $\pi/2$ phase retardation.

4. The laser oscillating apparatus according to claim 1, wherein the reflecting means comprises at least three reflecting mirrors providing a total of $\pi/2$ phase retardation.

5. The laser oscillating apparatus as claimed in claim 1, further comprising a coupling mirror, which receives the circularly polarized beam from the reflecting means.

6. A laser oscillating apparatus for producing a circularly polarized beam from an oscillating beam using a plane produced by two optical axes, comprising:

a rear mirror linearly polarizing the oscillating beam, wherein the rear mirror includes a roof reflector having a ridge set at an angle of $\pi/4$ with respect to the plane produced by the two optical axes; and a reflecting mirror receiving the linearly polarized beam and converting the linearly polarized beam into the circularly polarized beam, the reflecting mirror having a $\pi/2$ phase retardation.

7. The laser oscillating apparatus as claimed in claim 6, further comprising an output coupling mirror, which receives the circularly polarized beam from the reflecting mirror. mirror.

* * * * *

UNITED STATES PATENT AND TRADEMARK OFFICE
CERTIFICATE OF CORRECTION

PATENT NO. : 5,307,367
DATED : April 26, 1994
INVENTOR(S) : Norio KARUBE

It is certified that error appears in the above-indentified patent and that said Letters Patent is hereby corrected as shown below:

Column 1, Line 13, change "7ays" to --ways--.

Column 3, Line 48, change "&rom" to --from--.

Column 4, Line 50, delete "mirror." (second occurrence).

Signed and Sealed this

Sixteenth Day of August, 1994

Attest:

BRUCE LEHMAN

*Attesting Officer*      *Commissioner of Patents and Trademarks*